(12) United States Patent
Chadha

(10) Patent No.: US 7,184,802 B2
(45) Date of Patent: Feb. 27, 2007

(54) MOBILE COMMUNICATION DEVICE HAVING ROTATING KEYPAD ASSEMBLY

(75) Inventor: Lovleen Chadha, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 539 days.

(21) Appl. No.: 10/675,817

(22) Filed: Sep. 29, 2003

(65) Prior Publication Data

US 2005/0070324 A1     Mar. 31, 2005

(51) Int. Cl.
  *H04M 1/00* (2006.01)
(52) U.S. Cl. .............. 455/575.1; 455/550.1; 455/90.3; 379/433.06
(58) Field of Classification Search ............. 455/550.1, 455/556.1, 575.1, 575.4, 575.8, 90.1, 90.3; 379/428.01, 433.06–433.07, 368; 345/168, 345/169; 341/22, 35
  See application file for complete search history.

(56) References Cited

U.S. PATENT DOCUMENTS

| | | | |
|---|---|---|---|
| 5,436,954 A * | 7/1995 | Nishiyama et al. | ......... 455/566 |
| 5,485,517 A | 1/1996 | Gray | |
| 5,548,477 A | 8/1996 | Kumar et al. | |
| 5,696,496 A | 12/1997 | Kumar | |
| 5,901,223 A | 5/1999 | Wicks et al. | |
| 6,067,358 A | 5/2000 | Grant | |
| 6,483,445 B1 | 11/2002 | England | |
| 6,560,468 B1 | 5/2003 | Boesen | |
| 6,593,914 B1 | 7/2003 | Nuovo et al. | |
| 6,594,142 B2 | 7/2003 | Katz | |
| 6,665,173 B2 | 12/2003 | Brandenberg et al. | |
| 6,892,082 B2 | 5/2005 | Boesen | |
| 2003/0132863 A1 | 7/2003 | Lahr | |
| 2004/0203517 A1* | 10/2004 | Park et al. | ................ 455/90.3 |
| 2004/0212597 A1* | 10/2004 | Nuovo et al. | ............... 345/168 |

FOREIGN PATENT DOCUMENTS

DE     33 23 858 A1     1/1985

* cited by examiner

Primary Examiner—George Eng
Assistant Examiner—Marcos L. Torres

(57) ABSTRACT

A mobile communication device comprises a housing having a keypad assembly including one or more arrangements of keys for keying information into the mobile communication device. The keypad assembly may rotate within the housing either about an axis generally perpendicular to the face of the keypad assembly or about an axis generally parallel to the face of the keypad assembly for presenting different arrangements of keys to the user of the mobile communication device.

15 Claims, 9 Drawing Sheets

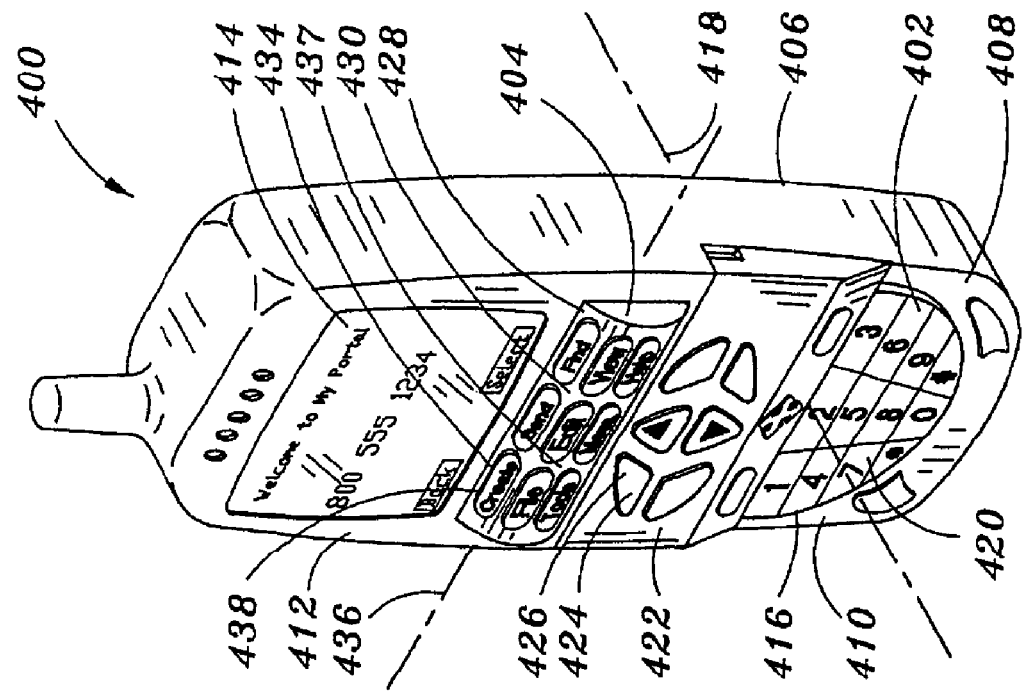
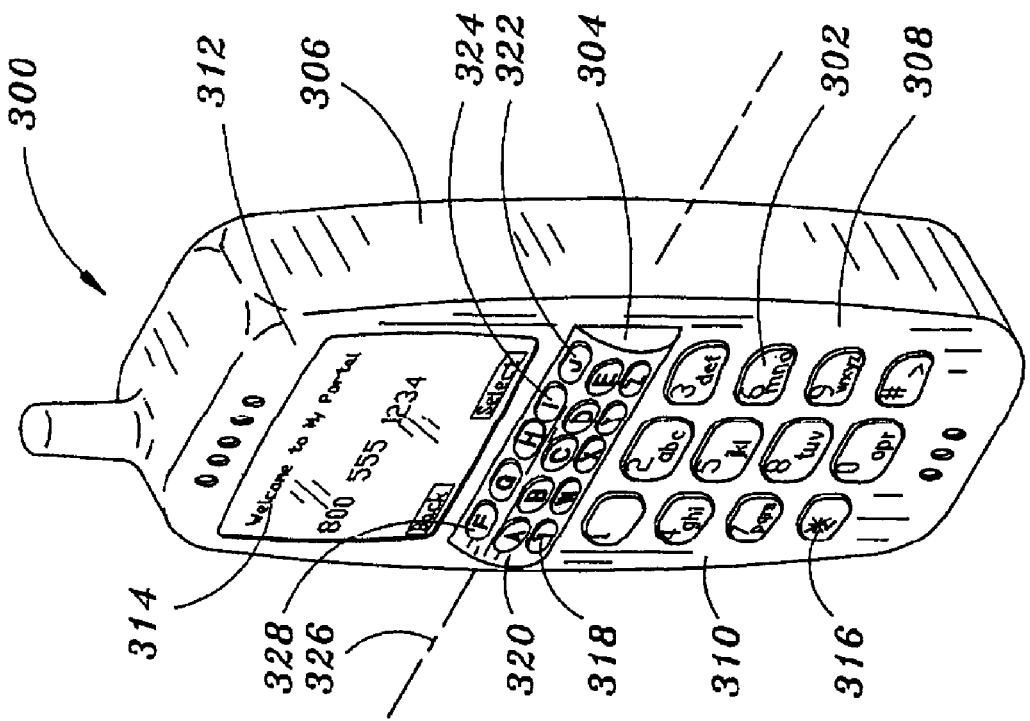

MOBILE COMMUNICATION DEVICE HAVING ROTATING KEYPAD ASSEMBLY

BACKGROUND OF THE INVENTION

The present invention relates generally to hand-held mobile communication devices such as mobile telephones, palmtop computers, personal digital assistants (PDA's), or the like, and more particularly, to a mobile communication device having a rotating keypad assembly thereby allowing the mobile communication device to provide its user with multiple key arrangements having a greater number of keys than possible with conventional keypads without unnecessarily increasing the size of the mobile communication device.

Many mobile communication devices, in particular, mobile telephones, comprise a small display and a telephonic or numeric keypad providing a limited number (e.g., twelve to fifteen) keys for keying numeric information such as telephone numbers, or the like, into the mobile communication device. However, many users find such keypads ill suited for entry of alphanumeric text such as address book entries, calendar entries, text messages, and the like, or for specialized functions such as gaming, e-mail or Internet browsing.

To alleviate such shortcomings, mobile communication devices such as palmtop computers, personal digital assistants (PDA's), or the like, typically provide alphanumeric (e.g., QWERTY) keypads or employ a display, overlaid with a touch sensitive panel or touch screen, instead of a keypad. A numeric keypad may then be displayed by the display when needed, such as when telephony functions are used. However, while such mobile communication devices provide an impressive suite of functions (e.g., address books, calendars, Internet access, and the like) to the user, they also have drawbacks. For example, mobile communication devices that employ alphanumeric keypads are generally more cumbersome to use than mobile communication devices employing conventional numeric keypads when telephony functions are desired. Likewise, numeric keypads typically do not support specialized functions such as gaming, Internet browsing, or the like. Similarly, mobile communication devices that employ displays overlaid with touch panels are typically more expensive than mobile communication devices employing conventional keypads. Such mobile communication devices are also somewhat less robust than devices employing conventional keypads since the large, open display and touch screen are more susceptible to damage than would be a conventional keypad and smaller display.

Consequently, it is desirable to provide a mobile communication device having a keypad assembly that is capable of providing keypads having different arrangements of keys (e.g., numeric keypads, alphanumeric keypads, keypads adapted for gaming, Internet browsing, etc., and the like) without unnecessarily increasing the overall size of the mobile communication device.

SUMMARY OF THE INVENTION

The present invention is directed to a mobile communication device having a rotating keypad assembly that allows the mobile communication device to provide multiple key arrangements and a greater overall number of keys without unnecessarily increasing the size of the device. The mobile communication device comprises a housing having a keypad assembly including one or more keypads each providing an arrangement of keys for keying information into the mobile communication device. In one specific embodiment, the keypad assembly rotates about an axis generally perpendicular to the face of the keypad assembly for presenting one of the keypads to the user of the mobile communication device. In a second specific embodiment, the keypad assembly rotates about an axis generally parallel to the face of the keypad assembly for presenting different arrangements of keys to the user of the mobile communication device.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWINGS

FIG. 19 is an isometric view illustrating a mobile communication device having a conventional numeric keypad and a rotating keypad assembly in accordance with an exemplary embodiment of the present invention, wherein the keypad assembly rotates about an axis generally parallel to the front face of the mobile communication device; and FIG. 20 is an isometric view illustrating a mobile communication device having rotating keypad assemblies in accordance with exemplary embodiments of the present invention, wherein a first keypad assembly rotates about an axis generally perpendicular to the front face of the mobile communication device and a second keypad assembly rotates about an axis generally parallel to the front face of the mobile communication device.

DETAILED DESCRIPTION OF SPECIFIC EMBODIMENTS

Reference will now be made in detail to the presently preferred embodiments of the invention, examples of which are illustrated in the accompanying drawings.

Figure 1:
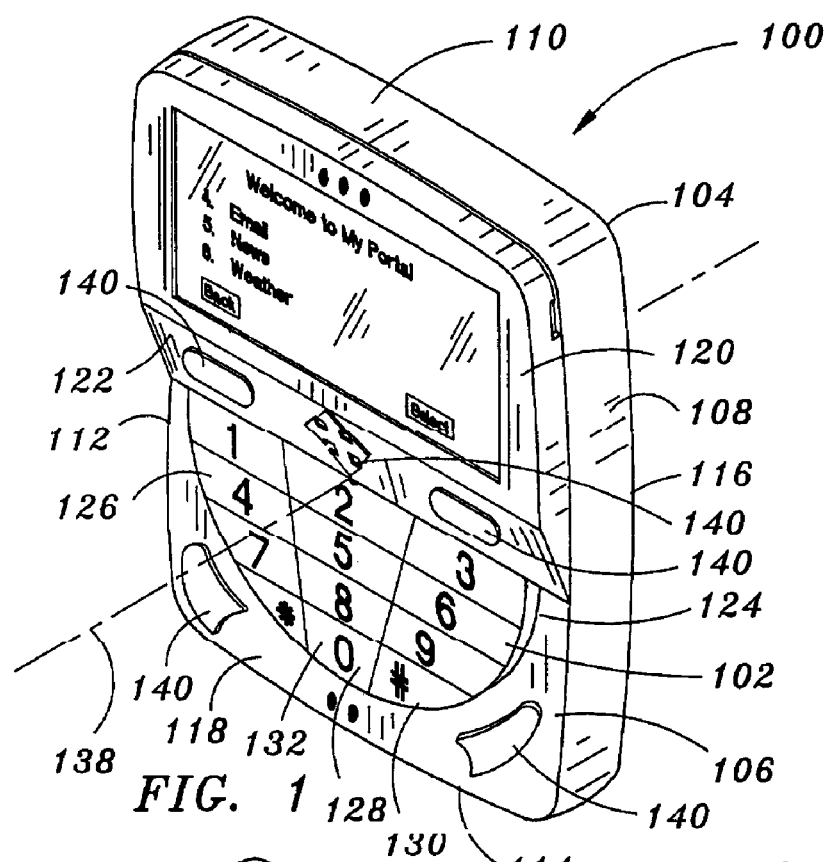
FIG. 1 is an isometric view illustrating a mobile communication device having a rotating keypad assembly in accordance with an exemplary embodiment of the present invention, wherein the keypad assembly rotates about an axis generally perpendicular to the face of the keypad assembly.
Figure 2:
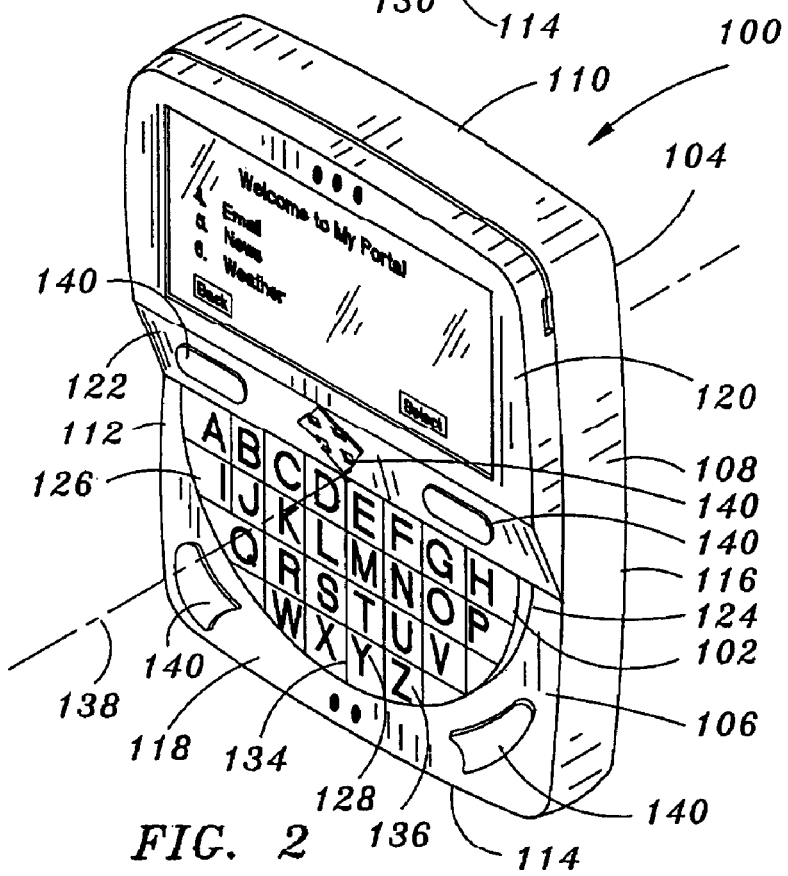
FIG. 2 is an isometric view of the mobile communication device shown in FIG. 1, wherein the rotating-disk keypad assembly is rotated to provide the alphabetic keypad.

FIGS. 1 and 2 illustrate a mobile communication device 100 having a rotating keypad assembly 102 in accordance with an exemplary embodiment of the present invention. The mobile communication device 100 comprises a housing 104, which is generally sized to be held in the hand of a user of the mobile communication device 100. The housing 104 includes a front surface 106, side surfaces 108, 110, 112 and 114 and a back surface 116. The front surface 106 is divided into a keypad face 118 and a display face 120. In the embodiment illustrated, the display face 120 is generally parallel to but raised from the keypad face 118 as viewed by a user of the mobile communication device 100, and is smoothly transitioned into the keypad face 118 via an angled portion or section 122.

The keypad assembly 102 is received within a cavity 124 formed in the keypad face 118 of the housing 104. The keypad assembly 102 includes a key face 128 having a first keypad 130, shown in FIG. 1, providing a first arrangement of keys 132 and a second keypad 134, shown in FIG. 2, providing a second arrangement of keys 136. The keypad assembly 102 rotates within the cavity 124 so that one of the first keypad 130 and the second keypad 134 is rotated to a first or exposed position within the keypad face 118 so that the arrangement of keys 132 or 136 of the keypad 130 or 134 is accessible by the user of the mobile communication device 100 for keying information into the mobile communication device 100. The other of the first keypad 130 and the second keypad 136 is simultaneously rotated to a second position within the housing 104 beneath the display face 120 so that the arrangement of keys 136 or 132 of the keypad 134 or 130 is at least substantially inaccessible by the user (i.e., the keys 136 or 132 cannot be depressed by the user). As shown, the keypad assembly 102 comprises a disk 126 that rotates within the cavity 124 about an axis 138 generally perpendicular to the key face 128 of the keypad assembly 102 and the keypad face 118 of the housing 104 so that the key face 128 of the keypad assembly 102 may be viewed by a user of the mobile communication device 100.

Figures 3, 4:
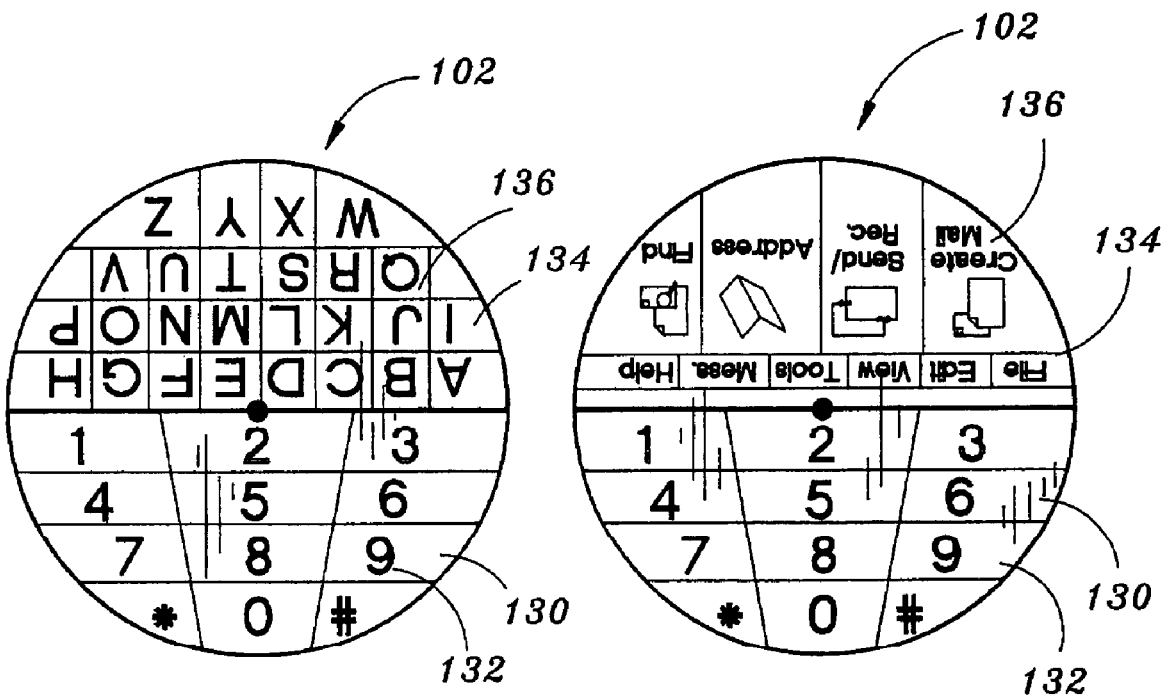
FIG. 3 is a top plan view of a keypad assembly of the mobile communication device shown in FIGS. 1 and 2.
FIG. 4 is a top plan view of a rotating keypad assembly for the mobile communication device shown in FIGS. 1 and 2, wherein the keypad assembly comprises numeric and Internet browser keypads.

In the embodiment illustrated in FIGS. 1 and 2, the keypad assembly 102 includes a first keypad 130 that comprises a numeric or telephone keypad having an arrangement of keys 132 providing the numbers "0" through "9", a "*" symbol, and a "#" symbol, while the second keypad 134 comprises an alphabetic keypad having an arrangement of keys 136 providing the letters "A" though "Z" arranged in alphabetical order. This keypad assembly 102 is shown in FIG. 3. Each keypad 130 and 134 occupies approximately one half of the keypad assembly 102 (e.g., half of disk 126). However, those of ordinary skill in the art will recognize that the present invention is not limited to the specific arrangements of keys 132 and 136 of the keypads 130 and 134 provided by the keypad assembly 102 shown in FIG. 3, but may instead employ keypads having a wide variety of key arrangements depending on the particular design requirements of the mobile communication device 100. For example, in FIG. 4, a keypad assembly 102 is illustrated having a first keypad 130 comprising the numeric or telephone keypad 130 shown in FIGS. 1, 2 and 3, and a second keypad 134 comprising an Internet browser keypad having an arrangement of keys 136 providing typical Internet browsing and electronic mail (e-mail) access functions. Other possible keypads may include, but are not limited to, arrangements of keys providing gaming controls (e.g., toggle controls, fire buttons, game selection controls, etc.), media playback controls (e.g., controls for controlling media recording and/or playback such as when the mobile communication device comprises an integrated MP3 player, or the like), a QWERTY keypad, a touchpad cursor control device, a digitizer device, personal digital assistant controls (e.g., controls for accessing a calendar, a phone list, or the like), and controls for accessing voice mail and/or text messages. Alternatively, a portion of the keypad assembly 102 may include no keys. When access to the arrangement of the keys of the keypad assembly 102 is not required, such as when the mobile communication device 100 is not in use, the keypad assembly 102 may be rotated so that the area containing no keys is in the first or exposed position within the keypad face 118 while a keypad (e.g., keypad 130 or 134) provided by the keypad assembly is in the second position within the housing 104 to prevent inadvertent depression of the keys of the keypad. The mobile communication device 100 may further include conventional keys and/or controls such as toggle control 140 in addition to the arrangements of keys 136 provided by the keypad assembly 102 for inputting information into the mobile communication device 100 and controlling mobile communication device functions.

Figure 5:
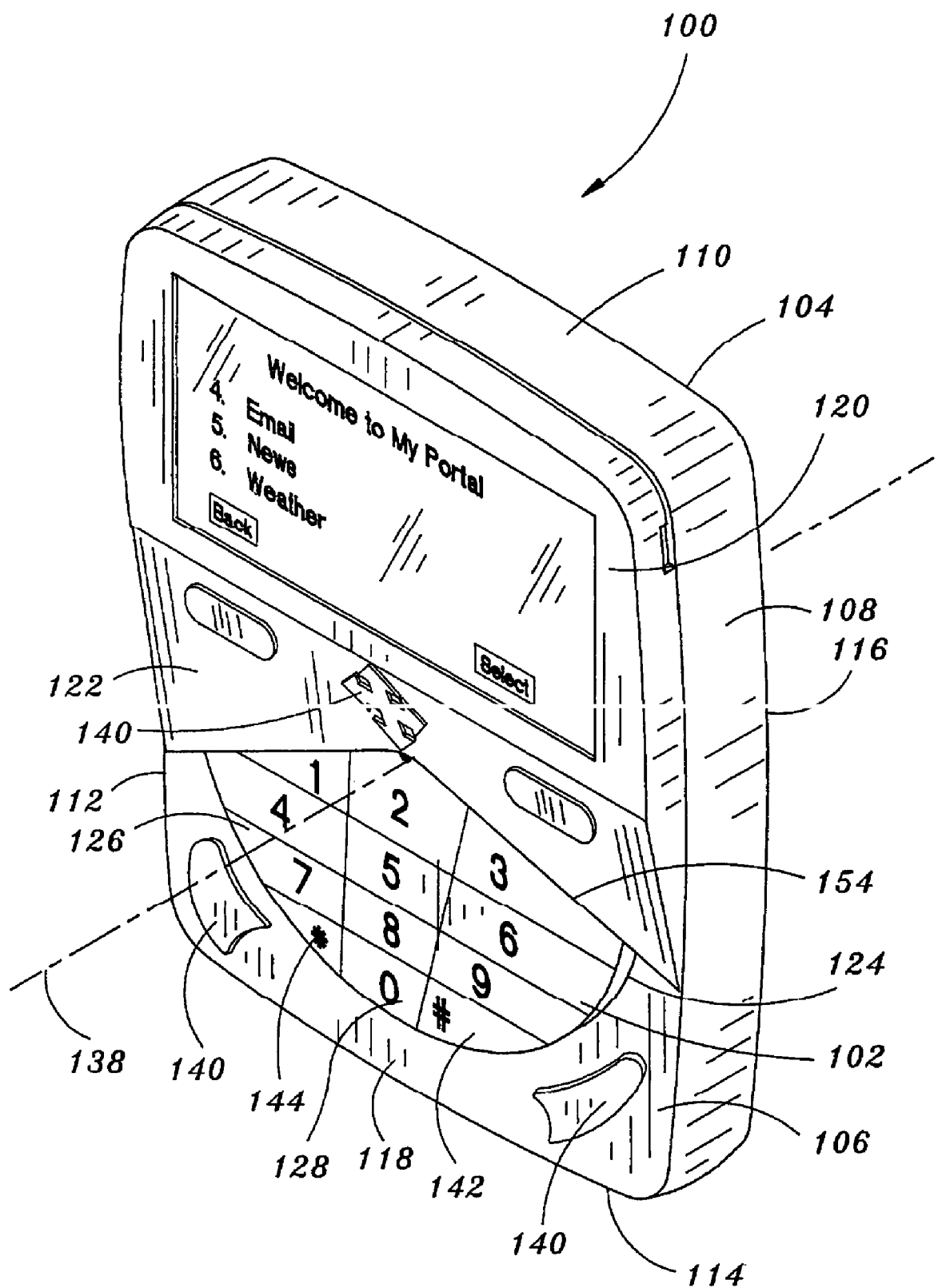
FIG. 5 is an isometric view illustrating a mobile communication device having a rotating keypad assembly in accordance with an exemplary embodiment of the present invention, wherein the keypad assembly includes three or more keypads.

FIG. 5 illustrates a mobile communication device 100 having a rotating keypad assembly 102 that includes three or more keypads in accordance with a second exemplary embodiment of the present invention. Like the mobile communication device 100 shown in FIGS. 1 and 2, the mobile communication device 100 shown in FIG. 5 comprises a housing 104, which is generally sized to be held in the hand of a user of the mobile communication device 100. The housing 104 includes a front surface 106 divided into a keypad face 118 and a display face 120 having an angled portion 122 smoothly transitioning the display face 120 into the keypad face 118, side surfaces 108, 110, 112 and 114 and a back face 116. The keypad assembly 102 is received within a cavity 124 formed in the keypad face 118 of the housing 104. The keypad assembly 102 comprises a disk 126 that rotates within the cavity 124 about an axis 138 generally perpendicular to key face 128 of the keypad assembly 102 and the keypad face 118 of the housing 104 so that the key face 128 of the keypad assembly 102 may be viewed by a user of the mobile communication device 100.

Figures 6, 7:
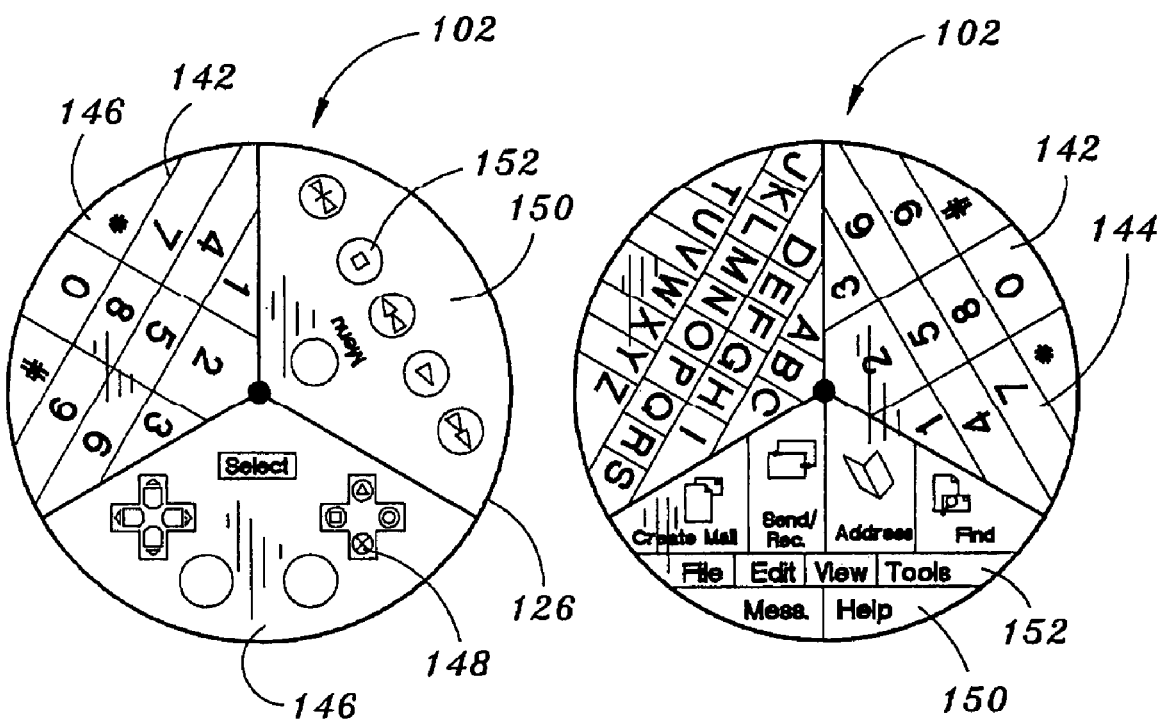
FIG. 6 is a top plan view of a rotating keypad assembly for the mobile communication device shown in FIG. 5, wherein the keypad assembly comprises numeric, camera and gaming keypads.
FIG. 7 is a top plan view of a rotating keypad assembly for the mobile communication device shown in FIG. 5, wherein the keypad assembly comprises numeric, alphabetic and Internet browser keypads.

In this embodiment, the keypad assembly 102 includes a first keypad 142 providing a first arrangement of keys 144, a second keypad 146 providing a second arrangement of keys 148, and a third keypad 150 providing a third arrangement of keys 152 each positioned in a different sector of the disk 126 of the keypad assembly 102 (see FIG. 6). The keypad assembly 102 rotates within the cavity 124 so that one of the first keypad 142, the second keypad 146 and the third keypad 150 is rotated to a first or exposed position within the keypad face 118 allowing the arrangement of keys 144, 148 or 152 of that keypad 142, 146 or 150 to be accessed by the user of the mobile communication device 100 for keying information into the mobile communication device 100. The others of the first keypad 142, the second keypad 146 and the third keypad 150 are simultaneously rotated to second positions within the housing 104 beneath the display face 120 so that the arrangement of keys 144, 148 or 152 of the keypads 142, 146 or 150 is at least substantially inaccessible by the user (i.e., the keys 144, 148 or 152 cannot be depressed by the user). Preferably, the angled portion 120 of the display face 120 is extended and provided with a generally V-shaped transition edge 154 along the keypad face 118 to enclose or cover keypads 142, 146 or 150 that are not rotated to the first or exposed position within the keypad face 118.

Figure 8:
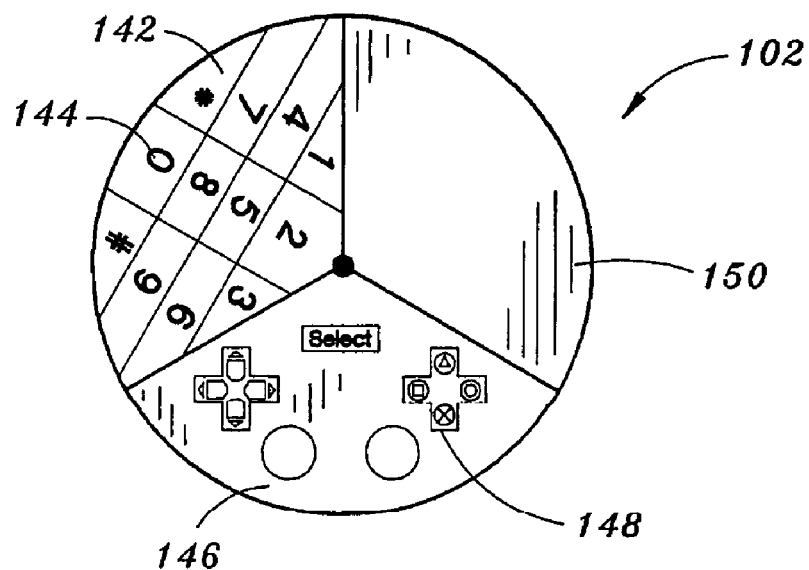
FIG. 8 is a top plan view of a rotating keypad assembly for the mobile communication device shown in FIG. 5, wherein the keypad assembly comprises numeric and Internet browsing keypad and a blank area.

FIGS. 6, 7 and 8 illustrate exemplary keypad assemblies 102 that are suitable for use with the mobile communication device 100 shown in FIG. 5. In FIG. 6, the keypad assembly 102 illustrated includes a first keypad 142 that comprises a numeric or telephone keypad having an arrangement of keys 144 providing the numbers "0" through "9", a "*" symbol, and a "#" symbol, while the second keypad 146 comprises an arrangement of key 148 providing gaming controls (e.g., toggle controls, fire buttons, game selection controls, etc.) and the third keypad 150 comprises an arrangement of keys 152 providing media playback controls (e.g., controls for controlling media recording and/or playback such as when the mobile communication device comprises an integrated MP3 player, or the like). In FIG. 7, the keypad assembly 102 illustrated includes a first keypad 142 that comprises a numeric or telephone keypad having an arrangement of keys 144 providing the numbers "0" through "9", a "*" symbol, and a "#" symbol, a second keypad 146 that comprises an alphabetic keypad having an arrangement of keys 148 providing the letters "A" though "Z" arranged in alphabetical order and a third keypad 150 that comprises an Internet browser keypad having an arrangement of keys 152 providing typical Internet browsing and electronic mail (e-mail) access functions. In FIG. 8, the keypad assembly 102 illustrated includes a first keypad 142 that comprises a numeric or telephone keypad having an arrangement of keys 144 providing the numbers "0" through "9", a "*" symbol, and a "#" symbol, while the second keypad 146 comprises an arrangement of keys 148 providing gaming controls (e.g., toggle controls, fire buttons, game selection controls, etc.). The third keypad 150 includes no keys. The keypad assembly 102 may be rotated so that the third keypad 150 (containing no keys) is in the first or exposed position within the keypad face 118 while the first and second keypads 142 and 146 are in the second positions within the housing 104 to prevent inadvertent depression of the keys of the keypads 142 and 146 when access to the keypads 142 and 146 is not required, such as when the mobile communication device 100 is not in use.

In the embodiments illustrated in FIGS. 6, 7 and 8, the keypad assemblies 102 include three keypads 142, 146 and 150, each of which is provided within a sector occupying approximately one third of the keypad assembly 102 (e.g., one third of disk 126). Nevertheless, those of ordinary skill in the art will recognize that keypad assemblies 102 of the present invention may include four or more keypads without departing from the scope and intent of the present invention. Moreover, as discussed in the description of FIGS. 1 through 4, these keypads (e.g., keypads 142, 146 and 150) are not limited to the arrangements of keys specifically describe herein, but may instead provide a wide variety of key arrangements depending on the particular design requirements of the mobile communication device 100 and may include a QWERTY keypad, a touchpad cursor control device, a digitizer device, personal digital assistant controls (e.g., controls for accessing a calendar, a phone list, or the like), and controls for accessing voice mail and/or text messages, or the like.

Figure 9:
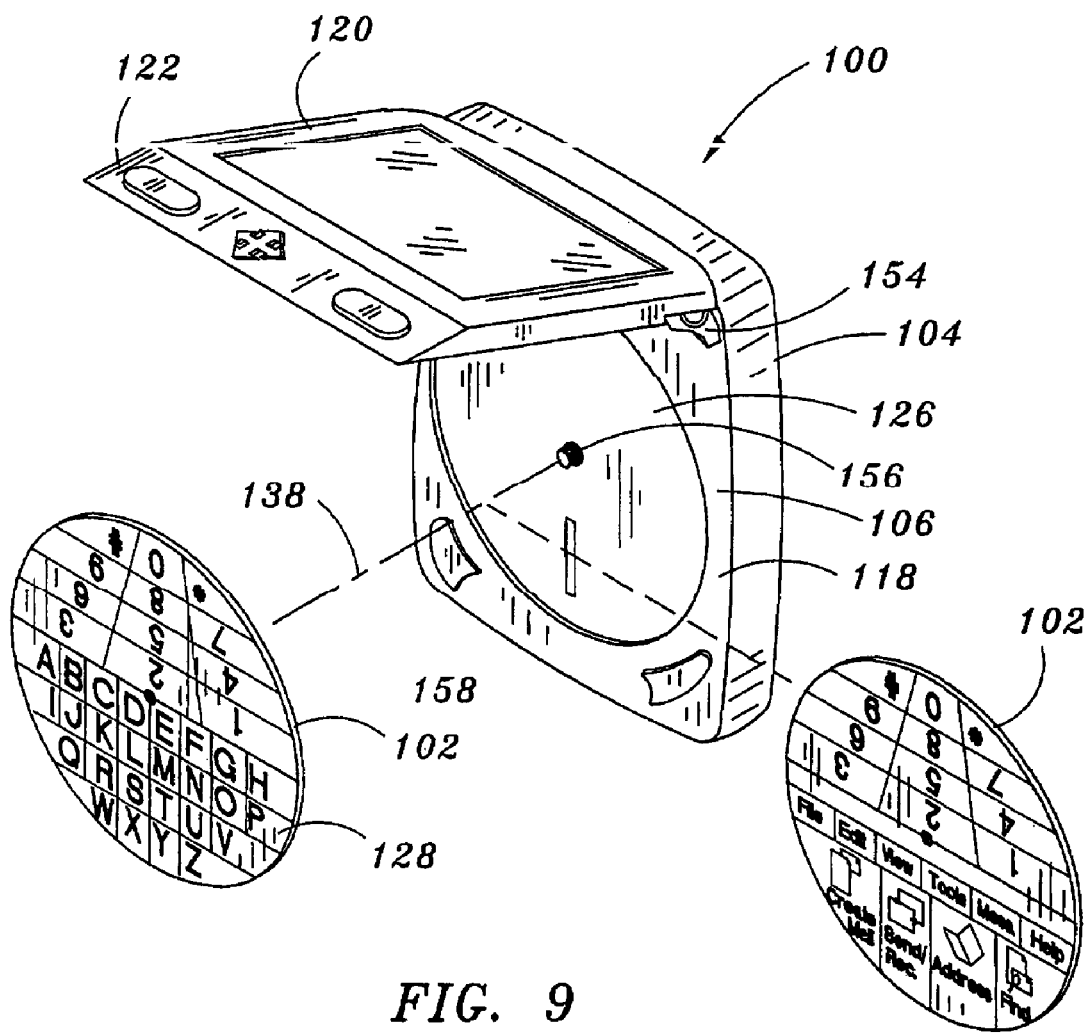
FIG. 9 is an isometric view illustrating a mobile communication device having a rotating keypad assembly in accordance with an exemplary embodiment of the present invention, wherein the rotating keypad assembly is removable and replaceable with a second keypad assembly having keypad providing additional key arrangements.

FIG. 9 illustrates a mobile communication device 100 having a rotating keypad assembly 102 that is removable and replaceable with a second keypad assembly 102 in accordance with an exemplary embodiment of the present invention. Like the mobile communication devices 100 shown in FIGS. 1, 2 and 5, the mobile communication device 100 shown in FIG. 9 comprises a housing 104, which is generally sized to be held in the hand of a user of the mobile communication device 100. The housing 104 includes a front surface 106 divided into a keypad face 118 and a display face 120 having an angled portion 122 smoothly transitioning the display face 120 into the keypad face 118. The keypad assembly 102, which is received within a cavity 124 formed in the keypad face 118 of the housing 104, comprises a disk 126 that rotates within the cavity 124 about an axis 138 generally perpendicular to the key face 128 of the keypad assembly 102 and the keypad face 118 of the housing 104 so that the key face 128 may be viewed by a user of the mobile communication device 100. The display face 120 pivots about a hinge assembly 154 between a closed position adjacent to the keypad face 118, and an opened position extending away from the keypad face 118 (shown in FIG. 9). While in the opened position, the display face 120 provides access to the cavity 124 formed in the keypad face 118 allowing keypad assemblies 102 to be removed from and inserted within the cavity 124. The display face 120 is then moved to the closed position to retain the keypad assembly 102 within the cavity. In this manner, the mobile communication device 100 may employ more than one keypad assembly 102, each providing keypads having a variety of key arrangements. As shown in FIG. 9, the housing 104 may include a spindle 156 extending from the surface of the housing 104 within the cavity 124 formed in the keypad face 118 along the axis 128 about which the keypad assembly 102 rotates. When inserted within the cavity, the keypad assembly 102 is engaged by the spindle 156 allowing the keypad assembly to rotate about the axis 128. The housing 104 may also include an electrical contact 158 which mates with a corresponding electrical contact on the back surface of the keypad assembly 102 to provide electrical interconnection between the keypad assembly and components within the housing 104.

It will be appreciated by those of ordinary skill in the art that embodiments of the mobile communication device 100 providing for removal and replacement of the keypad assembly 102 are not limited to the specific embodiment illustrated in FIG. 9. For example, the mobile communication device 100 may employ a keypad assembly 102 having three or more keypads, as shown in FIG. 5. Likewise, the display face may move between the opened and closed positions in a manner other than the manner specifically shown in FIG. 9. For example, instead of pivoting, the display face 120 may be made removable from the housing 104 or may slide between the opened and closed positions along a plane generally parallel to the keypad face 118. Such modifications to the embodiment of the invention specifically disclosed in the discussion of FIG. 9 would not depart from the scope and intent of the present invention.

In the embodiments illustrated in FIGS. 1, 2, 5 and 9, the keypad assembly 102 may be rotated by a user of the mobile communication device 100 by applying pressure to the face of the keypad assembly 102 (e.g., using the thumb or a finger) and scrolling the keypad assembly 102 in a circular direction about the axis 138 around which the keypad assembly 102 rotates until the desired keypad (e.g., keypad 130, 134, 142, 146 or 150) is presented in the first or exposed position within the keypad face 118. Alternatively, additional apparatus may be provided for rotating the keypad assembly 102.

Figures 10, 11:
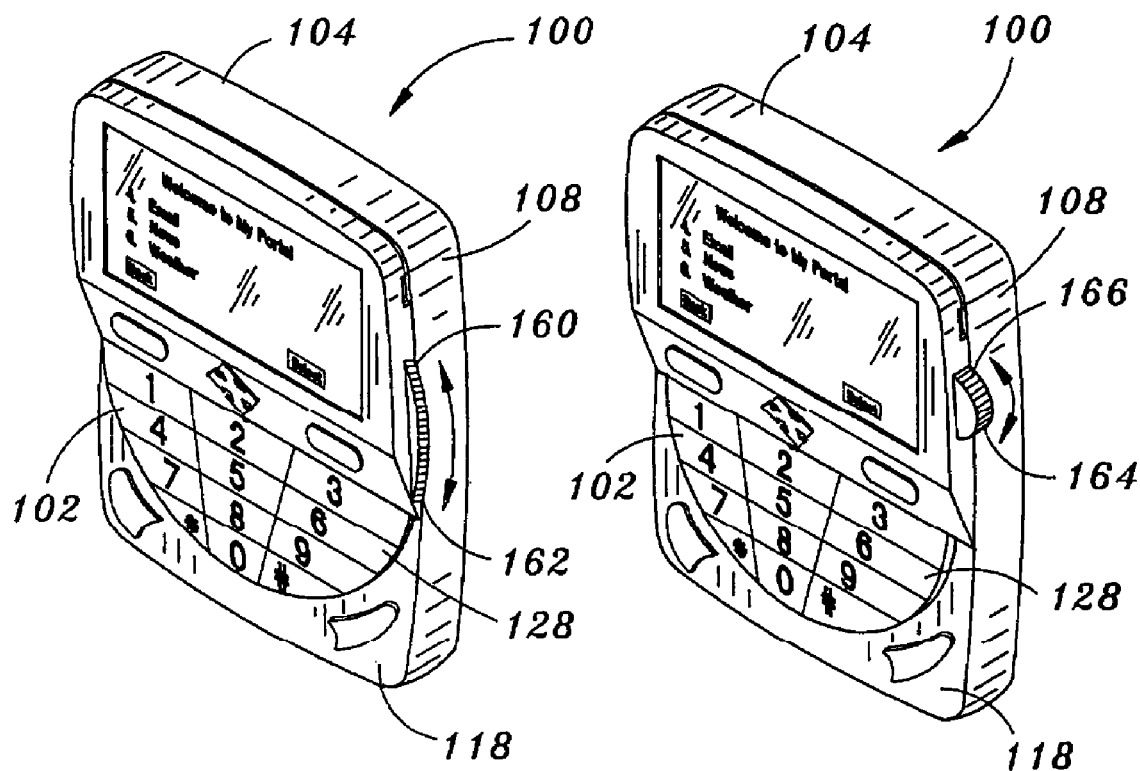
FIG. 10 is an isometric view illustrating a mobile communication device having a rotating keypad assembly in accordance with an exemplary embodiment of the present invention, wherein the edge of the keypad assembly protrudes from one or more of the side surfaces of the mobile communication device housing and the keypad assembly is rotated by scrolling the edge.
FIG. 11 is an isometric view illustrating a mobile communication device having a rotating keypad assembly in accordance with an exemplary embodiment of the present invention, wherein the housing of the mobile communication device comprises a side surface having a thumb wheel engaging the keypad assembly for rotating the keypad assembly.

For example, FIG. 10 illustrates a mobile communication device 100 in accordance with an exemplary embodiment of the present invention, wherein an edge 160 of the keypad assembly protrudes from one or more of the side surface 108, 110, 112 and/or 114 of the housing 104 of the mobile communication device 100 (e.g., in FIG. 10, the edge 160 protrudes from the right side surface 108 of the housing 104). To rotate the keypad assembly 102, a user of the mobile communication device 100 applies pressure to the edge 160 of the keypad assembly 102 (e.g., using the thumb or a finger) and scrolls the edge 160 until the desired keypad (e.g., keypad 130, 134, 142, 146 or 150) is presented in the first or exposed position within the keypad face 118. The edge 160 of the keypad assembly 102 may have a textured surface 162 (e.g., a surface provided with burling or ridges, a rubberized surface, or the like) to reduce slipping between the edge 160 and the finger or thumb of the user.

Similarly, FIG. 11 illustrates a mobile communication device 100 having a thumb wheel 164 extending from the side surface 108 (or, alternatively the side surface 110, 112 or 114) of the housing. The thumb wheel 164 engages the keypad assembly 102 either directly or via a transmission assembly for rotating the keypad assembly 102. A user of the mobile communication device 100 applies pressure to the thumb wheel 164 (e.g., using the thumb or a finger) and scrolls the thumb wheel 162 which causes the keypad assembly 102 to rotate until the desired keypad (e.g., keypad 130, 134, 142, 146 or 150) is presented in the first or exposed position within the keypad face 118. The thumb wheel 164 may have a textured surface 166 (e.g., a surface provided with burling or ridges, a rubberized surface, or the like) to reduce slipping between the thumb wheel 164 and the finger or thumb of the user.

Figure 12:
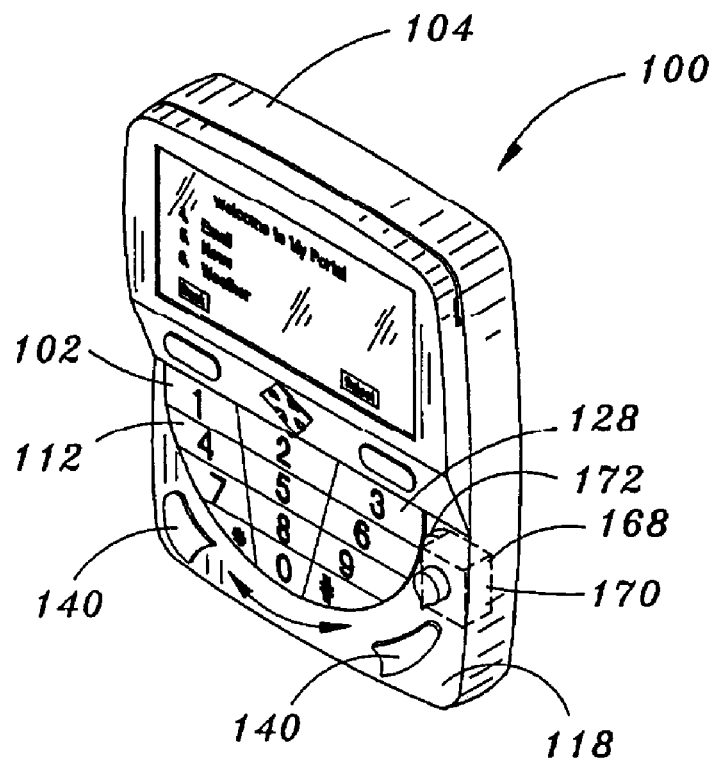
FIG. 12 is an isometric view illustrating a mobile communication device having a rotating keypad assembly in accordance with an exemplary embodiment of the present invention, wherein the mobile communication device further comprises a motor assembly for rotating the keypad assembly.

FIG. 12 illustrates a mobile communication device 100 having a motor assembly 168 for rotating the keypad assembly 102. The motor assembly 168 includes a motor or solenoid 170 driving a transmission 172 engaging the keypad assembly 102. Preferably, a user of the mobile communication device 100 rotates the keypad assembly 102 by depressing or actuating keys or buttons 140 positioned on the keypad face 118 (or, alternatively, elsewhere on the mobile communication device housing 104). For instance, in the embodiment shown in FIG. 12, the user may press a key 140 positioned to the left of the keypad assembly 102 in the keypad face 118, as viewed by the user, to actuate the motor assembly 168 for rotating the keypad assembly 102 in the clockwise direction, and may press a key 140 positioned to the right of the keypad assembly 102 in the keypad face 118, as viewed by the user, to actuate the motor assembly 168 for rotating the keypad assembly 102 in the counterclockwise direction until the desired keypad (e.g., keypad 130, 134, 142, 146 or 150) is presented in the first or exposed position within the keypad face 118. However, it is to be understood that the mobile communication device 100 is not limited to this specific embodiment, but may instead employ other key arrangements and locations without departing from the scope and spirit of the invention.

In exemplary embodiments of the invention, the keypad assembly 102 may rotate though a full 360 degree arc about the axis 138. A friction or ratcheting assembly may be provided to prevent unwanted rotation of the keypad assembly. Alternatively, it is contemplated that the keypad assembly 102 may, depending on design preferences, be restrained to only rotate though an arc sufficient to present each keypad (e.g., keypad 130, 134, 142, 146 or 150) in the first or exposed position within the keypad face 118, be constrained to only rotate in either the clockwise or counter clockwise directions, or the like, without departing from the scope and intent of the invention.

In FIGS. 1 through 12, the key face 128 of the keypad assembly 102 and display face 120 are illustrated as being parallel to and substantially co-planer with the keypad face 118 so that the axis 138 about which the keypad assembly rotates is perpendicular to the keypad face 118. However, it will be understood by those of ordinary skill in the art that the keypad face 118 and the key face 128 of the keypad assembly 102 need not be co-planar and need not be parallel to one another. Thus, for example, the keypad assembly 102 may be inset within the keypad face 118 of the housing 104, or may extend outward from the keypad face 118. Similarly, the keypad face 118 or display face 120 may be angled or curved or contain surfaces which are angled or curved with respect to the key face 128 of the keypad assembly 102 so that the axis 128 about which the keypad assembly 102 rotates is not exactly perpendicular to the keypad face 118. Moreover, the key face 128 need not be perfectly flat, but may be angled or curved. Such modifications to the mobile communication devices 100 shown in FIGS. 1 though 12 would not depart from the scope and intent of the present invention.

Referring now to FIGS. 13 through 17, a mobile communication device 200 having a rotating keypad assembly 202 in accordance with a second exemplary embodiment of the present invention is described. Like the mobile communication device 100 depicted in FIGS. 1 though 12, the mobile communication device 200 shown in FIGS. 13 though 17 comprises a housing 204, which is generally sized to be held in the hand of a user. The housing 204 includes a front surface 206, side surfaces 208, 210, 212 and 214 and a back surface 216. The front surface 206 is divided into a keypad face 218 containing the keypad assembly 202 and a display face 220 having a display 222. In the embodiment illustrated, the display face 220 and display 222 are generally co-planar with the keypad face 218.

The keypad assembly 202 is received within a cavity 224 formed in the keypad face 218 of the housing 204. The keypad assembly 202 comprises a spindle 226 that includes a key face 228 having a plurality of keys 230 arranged in rows 232. In this embodiment, the keypad assembly 202 (i.e., spindle 226) rotates or rolls within the cavity 224 about an axis 234 generally parallel to the key face 228 of the keypad assembly 202 and the keypad face 218 of the housing 204. This rotation allows an arrangement of keys 236 including one or more rows 232 of keys 230 (e.g., three adjacent rows 232 of keys 230 in the embodiment illustrated) to be rotated to a first or exposed position within the keypad face 218 where the rows 232 of keys 230 are accessible by the user of the mobile communication device 200 for keying information into the mobile communication device 200. The remaining rows 232 of keys 230 are simultaneously rotated to a second position within the housing 204 so that the keys 230 of these rows 232 are at least substantially inaccessible by the user (i.e., the keys 230 cannot be depressed by the user). As the keypad assembly 202 rotates within the cavity 224, a new arrangement of keys 238 comprising at least one different row 232 of keys 230 is rotated to a second position within the housing 204.

Figure 13:
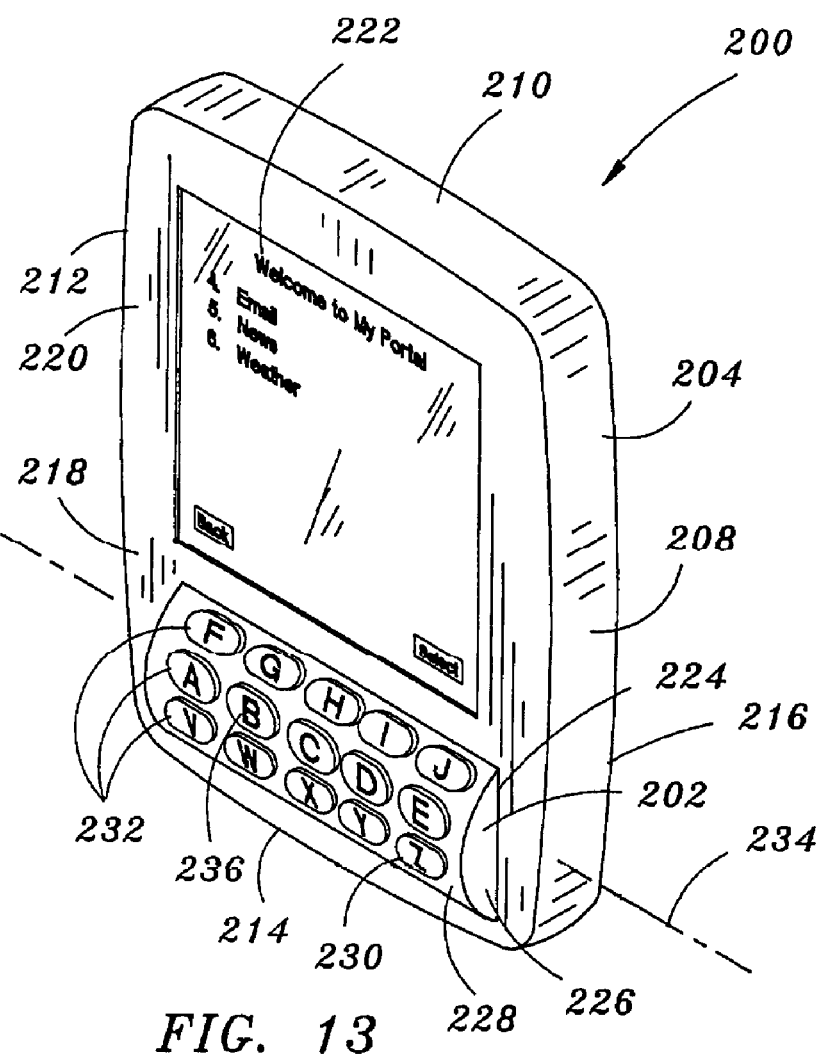
FIG. 13 is an isometric view illustrating a mobile communication device having a rotating keypad assembly in accordance with an exemplary embodiment of the present invention, wherein the keypad assembly rotates about an axis generally parallel to the face of the keypad assembly.
Figure 14:
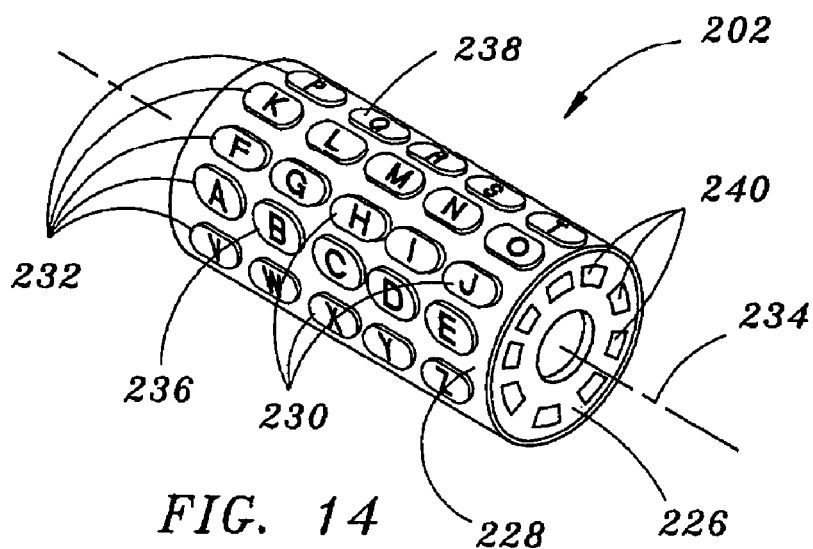
FIG. 14 is an isometric view of a rotating keypad assembly for the mobile communication device shown in FIG. 13.
Figure 15:
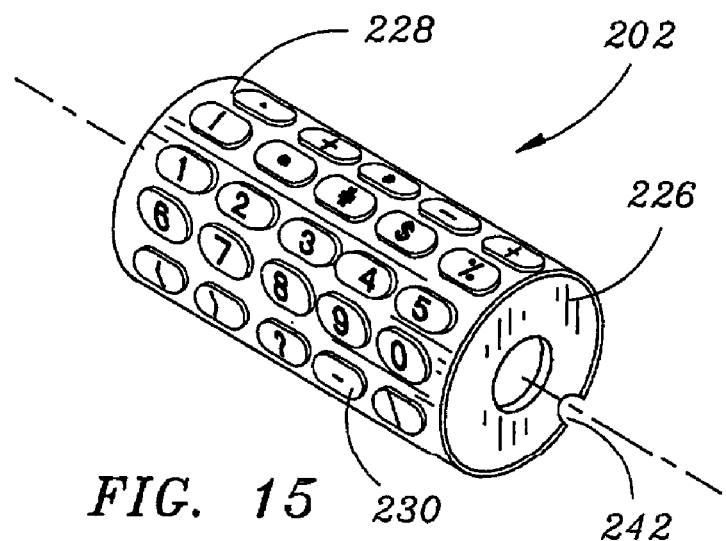
FIG. 15 is an isometric view of a rotating keypad assembly for the mobile communication device shown in FIG. 13, wherein the keypad assembly includes an electrical connector for electrically coupling the keypad assembly to the mobile communication device.
Figure 16:
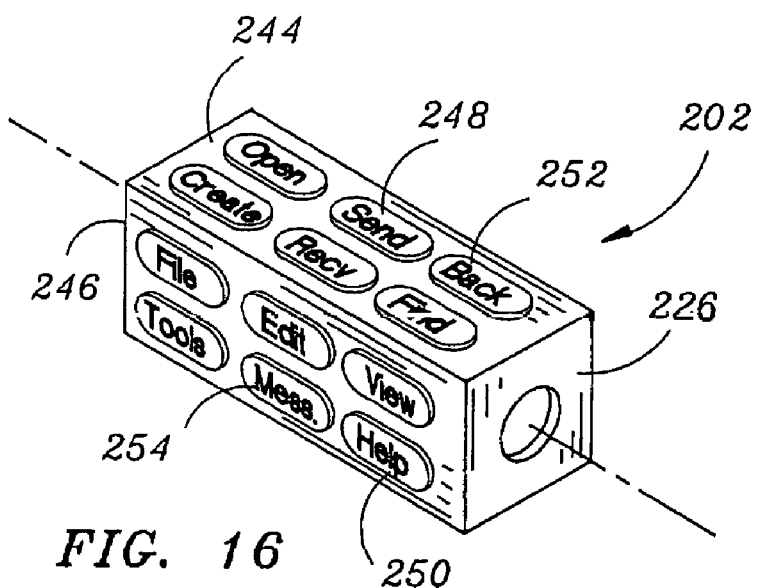
FIG. 16 is an isometric view of a rotating keypad assembly for the mobile communication device shown in FIG. 13.
Figure 17:
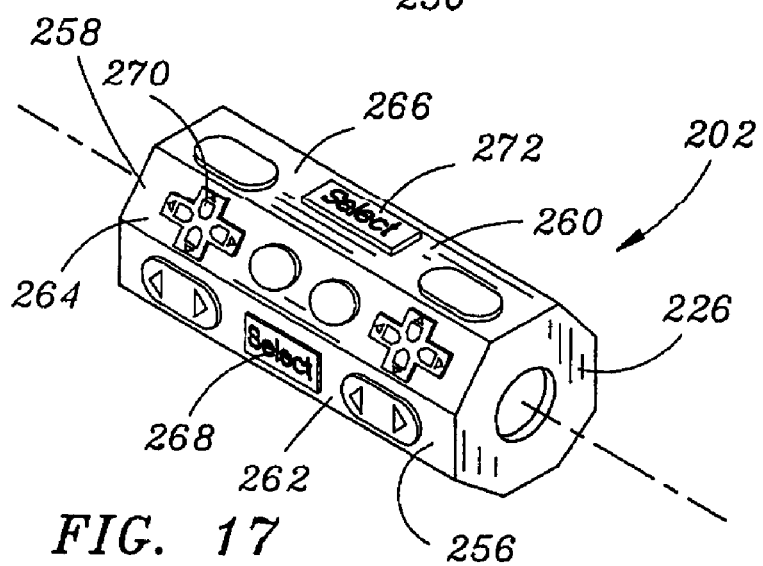
FIG. 17 is an isometric view of a rotating keypad assembly for the mobile communication device shown in FIG. 13.

In the embodiment illustrated in FIGS. 13 and 14, the keypad assembly 202 comprises a cylindrical spindle 226 providing an alphabetic keypad having keys 230 providing the letters "A" through "Z". One or more electrical contacts 240 mate with corresponding electrical contacts within the housing 104 to provide electrical interconnection between the keypad assembly 202 and components within the housing 104 of the mobile communication device 200. However, the keypad assembly 202 is not limited to this embodiment, but may instead employ a variety of spindle designs and key arrangements depending on the particular design requirements of the mobile communication device 200. For example, in FIG. 15, a keypad assembly 202 is illustrated that comprises a cylindrical spindle 226 providing a numeric keypad having keys 230 providing the numbers "0" though "9" and function keys such as "+", "−", "*", "/", "=", and the like. In this embodiment, an electrical contact 242 comprising a groove or slit in the spindle 226 opposite the key face 228 mates with corresponding electrical contacts within the housing 104 to provide electrical interconnection between the keypad assembly 202 and components within the housing 104 of the mobile communication device 200. Similarly, in FIG. 16, a keypad assembly 202 is illustrated that comprises a rectangular spindle 226 including faces 244 and 246 providing keypads 248 and 250, respectively, that include key arrangements 252 and 254 adapted for Internet browsing and email access, while in FIG. 17, a keypad assembly 202 is illustrated that comprises a faceted (e.g., octagonal) spindle 226 including faces 256, 258 and 260 providing keypads 262, 264 and 266, respectively, that include key arrangements 268, 270 and 272 suitable for gaming (e.g., toggle controls, fire buttons, game selection controls, etc.). Other possible keypad assemblies 202 may include, but are not limited to, arrangements of keys providing media playback controls (e.g., controls for controlling media recording and/or playback such as when the mobile communication device comprises an integrated MP3 player, or the like), a QWERTY keypad, a touchpad cursor control device, a digitizer device, personal digital assistant controls (e.g., controls for accessing a calendar, a phone list, or the like), and controls for accessing voice mail and/or text messages. Alternatively, a portion of the keypad assembly 202 may include no keys. When access to the keys 230 of the keypad assembly 202 is not required, such as when the mobile communication device 200 is not in use, the keypad assembly 202 may be rotated so that the area containing no keys is in the first or exposed position within the keypad face 218 to prevent inadvertent depression of the keys of the keypad. As in the embodiments shown in FIGS. 1 though 12, the mobile communication device 200 may further include conventional keys and/or controls such as toggle control in addition to the keys 230 provided by the keypad assembly 202 for inputting information into the mobile communication device 202 and controlling mobile communication device functions.

Figure 18:
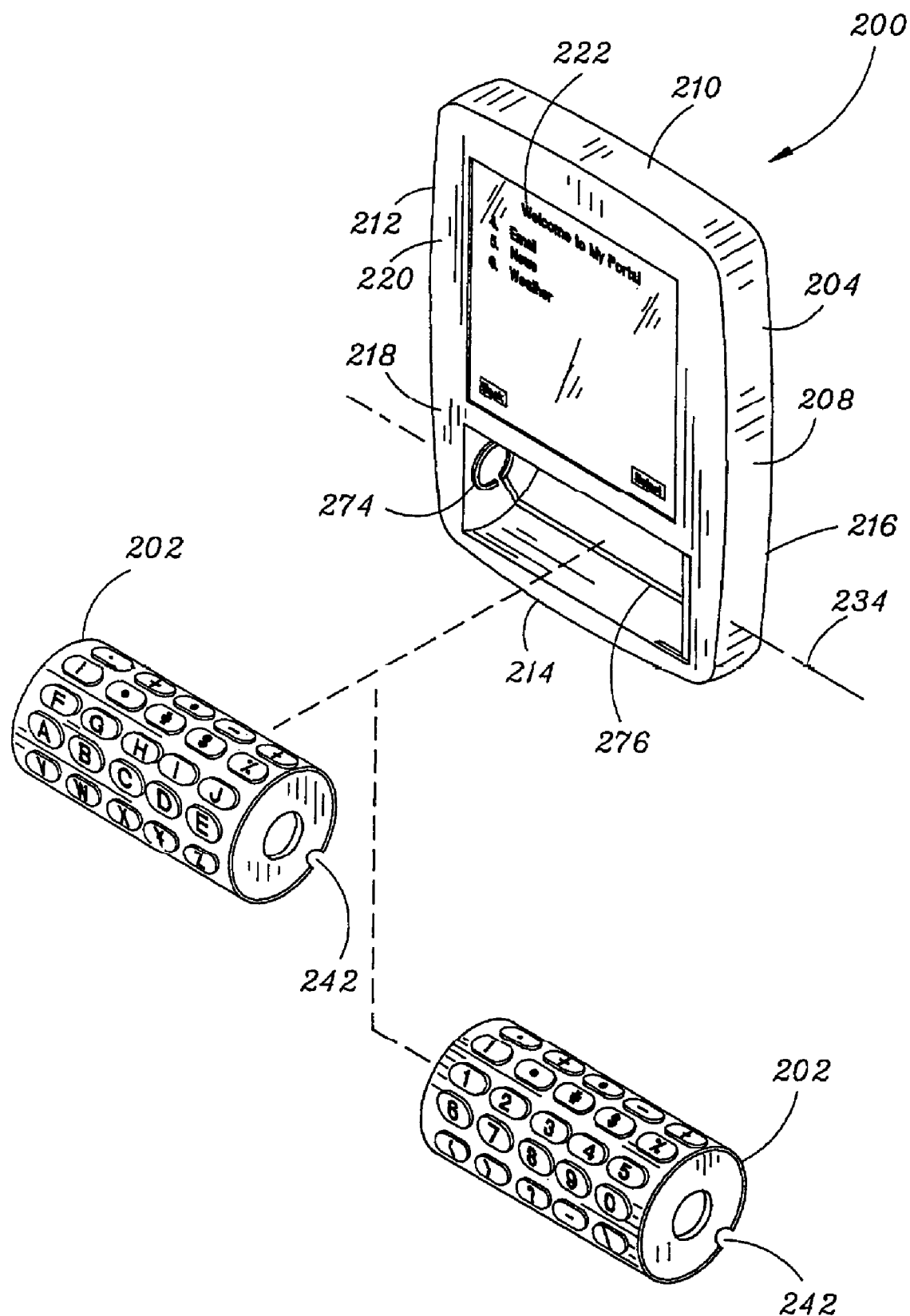
FIG. 18 is an isometric view illustrating a mobile communication device having a rotating keypad assembly in accordance with an exemplary embodiment of the present invention, wherein the rotating keypad assembly is removable and replaceable with a second keypad assembly having keypad providing additional key arrangements.

FIG. 18 illustrates a mobile communication device 200 having a rotating keypad assembly 202 that is removable and replaceable with a second keypad assembly 202 in accordance with an exemplary embodiment of the present invention. Like the mobile communication device 200 shown in FIG. 13, the mobile communication device 200 shown in FIG. 18 comprises a housing 204, which is generally sized to be held in the hand of a user of the mobile communication device 200. The housing 204 includes a front surface 206 divided into a keypad face 218 and a display face 220 including a display 222. Each keypad assembly 202 comprises a spindle 226 that rotates within a cavity 224 about an axis 238 generally parallel to the key face 228 of the keypad assembly 202 and the keypad face 216 of the housing 204. As shown in FIG. 18, the keypad assemblies 202 may be removably received within a cavity 224 formed in the keypad face 218 of the housing 204 via pivot or axle assembly 274. In this manner, the mobile communication device 200 may employ more than one keypad assembly 102 each providing keypads having a variety of key arrangements. The housing 104 may also include electrical contacts 276 which mate with corresponding electrical contacts 242 on the keypad assembly 202 to provide electrical interconnection between the keypad assembly and components within the housing 204.

Referring to FIGS. 19 and 20, it is contemplated that mobile communication devices in accordance with the present invention which combine the rotating keypad assemblies 102 and 202 illustrated in FIGS. 1 through 18 with conventional keypads or with each other.

FIG. 19 illustrates a mobile communication device 300 having a conventional numeric keypad 302 and a rotating keypad assembly 304 in accordance with an exemplary embodiment of the present invention. The mobile communication device 300 comprises a housing 306, which is generally sized to be held in the hand of a user. The housing 306 includes a front surface 308 having a keypad face 310 and a display face 312 including a display 314.

In the embodiment shown in FIG. 19, the conventional keypad 302 comprises a numeric or telephone keypad having an arrangement of keys 316 providing the numbers "0" through "9", a "*" symbol, and a "#" symbol. However, the keypad 302 is not limited to this specific configuration but may include any combination of numeric, alphanumeric or specialized function keys. The rotating keypad assembly 304 is positioned in the keypad face 310 between the conventional keypad 302 and the display 314. The rotating keypad assembly 304 comprises a spindle 318 that includes a key face 320 having a plurality of keys 322 arranged in rows 324. The rotating keypad assembly 304 (i.e., spindle 318) rotates or rolls about an axis 326 generally parallel to the key face 320 of the keypad assembly 304 and the keypad face 310 of the housing 306. As described in the discussion of FIGS. 13 though 17, this rotation allows arrangements of keys 328 including one or more rows 324 of keys 322 to be rotated between a first or exposed position within the keypad face 310 and a second position within the housing 306.

FIG. 20 illustrates a mobile communication device 400 having rotating keypad assemblies 402 and 404 in accordance with exemplary embodiments of the present invention. The mobile communication device 400 comprises a housing 406, which is generally sized to be held in the hand of a user. The housing 406 includes a front surface 408 having a keypad face 410 and a display face 412 including a display 414.

As shown in FIG. 20, the first rotating keypad assembly 402 comprises a disk 416 that rotates about an axis 418 generally perpendicular to the key face 420 of the keypad assembly 402 and the keypad face 410 of the housing 406 as generally described in the discussion of FIGS. 1 though 12. In exemplary embodiments, the first keypad assembly 402 may be removed and replaced with a second keypad assembly. In such embodiments, a portion 422 of the keypad face 410 pivots about a hinge assembly between a closed position adjacent to the keypad face 410, and an opened position extending away from the keypad face 410 (see FIG. 9). While in the opened position, the pivoting portion 422 of the keypad face 410 provides access to the first keypad assembly 402 allowing the keypad assembly 402 to be removed and replaced. In the embodiment shown in FIG. 20, a third, conventional keypad 424 is provided in the surface of the pivoting portion 422 of the keypad face 410 providing function keys 426 for controlling functions of the mobile communication device 400.

The second rotating keypad assembly 404 is positioned in the keypad face 410 between the third keypad 424 and the display 414. The second rotating keypad assembly 304 comprises a spindle 428 that includes a key face 430 having a plurality of keys 432 arranged in rows 434. The second rotating keypad assembly 404 (i.e., spindle 428) rotates or rolls about an axis 436 generally parallel to the key face 430 of the keypad assembly 404 and the keypad face 410 of the housing 406. As described in the discussion of FIGS. 13 though 17, this rotation allows arrangements of keys 438 including one or more rows 434 of keys 432 to be rotated between a first or exposed position within the keypad face 410 and a second position within the housing 406.

The mobile communication devices 100, 200, 300 and 400 may, in exemplary embodiments, comprise a mobile telephone, and may further include components for providing wireless communication of voice and/or data information with external sources such as a base station, a cellular communication system tower, a second mobile communication device, or the like. For example, the mobile communication devices 100, 200, 300 and 400 may comprise a processing assembly, memory, a transmitter/receiver assembly or transceiver, an antenna, a data card reader for receiving a data card (e.g., a subscriber identification module (SIM) card or a user identification module (UIM) card), a speaker or earpiece assembly, a microphone, a power source such as a battery, and the like. Additionally, it is contemplated that the mobile communication devices 100, 200, 300 and 400 may provide functions other than telephony. For example, the mobile communication devices 100, 200, 300 and 400 may provide functions common to hand held computers or personal digital assistants, portable gaming devices, or the like. In such embodiments, the mobile communication device may further include a suitable processing system, extended memory, a touch screen overlaying display for tactile input of data, or the like.

For purposes of illustration, the embodiments of the mobile communication devices 100, 200, 300 and 400 illustrated in FIGS. 1 through 20 are exemplary, and are thus shown in "brick" form with ornate features eliminated. However, those of ordinary skill in the art will recognize that mobile communication devices in accordance with the present invention are not limited to the specific configurations disclosed herein, but instead may employ form factors having other ornamental or functional design features without departing from the scope and intent of the present invention.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A mobile communication device, comprising:
   a housing; and
   a keypad assembly disposed in the housing, the keypad assembly having at least a first arrangement of keys and a second arrangement of keys,
   wherein the keypad assembly rotates for alternately presenting one of the first arrangement of keys and the second arrangement of keys to a user of the mobile communication device for keying information into the mobile communication device, the keypad assembly comprising a key face on which the first and second arrangements of keys are disposed and the keypad assembly rotates about an axis generally parallel to the key face, the keypad assembly further comprising a spindle and the first arrangement of keys and the second arranaement of keys comprise rows of keys disposed along the spindle.

2. The mobile communication device as claimed in claim 1, wherein the keypad assembly rotates so that one of the first arrangement of keys keypad and the second arrangement of keys is rotated to a first position accessible by the user while the other of the first arrangement of keys and the second arrangement of keys is rotated to a second position at least substantially inaccessible by the user for keying information into the mobile communication device.

3. The mobile communication device as claimed in claim 1, wherein the housing comprises a front surface and the keypad assembly protrudes from the front surface.

4. The mobile communication device as claimed in claim 1, further comprising a motor assembly for rotating the keypad assembly.

5. The mobile communication device as claimed in claim 1, wherein the keypad assembly is removable from the housing.

6. A mobile communication device, comprising:
a housing having a keypad face;
a keypad assembly disposed in the housing, the keypad assembly including at least a first arrangement of keys and a second arrangement of keys for keying information into the mobile communication device,
wherein the keypad assembly rotates about an axis generally parallel to the keypad face for presenting one of the first arrangement of keys and the second arrangement of keys to a user of the mobile communication device for keying information into the mobile communication device, the keypad assembly comprising a spindle and the first arrangement of keys and the second arrangement of keys comprise rows of keys disposed along the spindle.

7. A mobile communication device, comprising:
a housing; and
a keypad assembly disposed in the housing, the keypad assembly including an arrangement of keys,
wherein the keypad assembly rotates within the housing so that the arrangement of keys is rotated between a first position accessible by the user for keying information into the mobile communication device and a second position at least substantially inaccessible by the user for keying information into the mobile communication device, the keypad assembly comprising a spindle and the arrangement of keys comprise rows of keys disposed alono the spindle.

8. The mobile communication device as claimed in claim 7, wherein the housing comprises a keypad face and the keypad assembly rotates about an axis generally parallel to the keypad face.

9. The mobile communication device as claimed in claim 7, wherein the keypad assembly is removable from the housing.

10. The mobile communication device as claimed in claim 6, wherein the keypad assembly rotates so that one of the first arrangement of keys and the second arrangement of keys is rotated to a first position accessible by the user while the other of the first arrangement of keys and the second arrangement of keys is rotated to a second position at least substantially inaccessible by the user for keying information into the mobile communication device.

11. The mobile communication device as claimed in claim 6, wherein the housing comprises a front surface and the keypad assembly protrudes from the front surface.

12. The mobile communication device as claimed in claim 6, further comprising a motor assembly for rotating the keypad assembly.

13. The mobile communication device as claimed in claim 6, wherein the keypad assembly is removable from the housing.

14. The mobile communication device as claimed in claim 7, wherein the housing comprises a front surface and the keypad assembly protrudes from the front surface.

15. The mobile communication device as claimed in claim 7, further comprising a motor assembly for rotating the keypad assembly.

* * * * *